(12) United States Patent
Itoh et al.

(10) Patent No.: US 9,617,083 B2
(45) Date of Patent: Apr. 11, 2017

(54) TRANSFER APPARATUS AND POSITIONING METHOD OF DEVICE HAVING MOTOR

(71) Applicant: ITOH DENKI CO., LTD., Kasai-shi, Hyogo (JP)

(72) Inventors: Kazuo Itoh, Kasai (JP); Toshiyuki Tachibana, Himeji (JP); Shinji Sayama, Kakogawa (JP)

(73) Assignee: Itoh Denki Co., Ltd. (JP)

( * ) Notice: Subject to any disclaimer, the term of this patent is extended or adjusted under 35 U.S.C. 154(b) by 0 days.

(21) Appl. No.: 14/565,466

(22) Filed: Dec. 10, 2014

(65) Prior Publication Data
US 2015/0210484 A1    Jul. 30, 2015

(30) Foreign Application Priority Data
Jan. 29, 2014   (JP) .................... 2014-014014

(51) Int. Cl.
B65G 47/53    (2006.01)
B65G 47/54    (2006.01)

(52) U.S. Cl.
CPC .................... B65G 47/54 (2013.01)

(58) Field of Classification Search
CPC .................................................... B65G 47/53
USPC .............................................. 318/34, 35, 39
See application file for complete search history.

(56) References Cited

U.S. PATENT DOCUMENTS

| | | | | |
|---|---|---|---|---|
| 4,788,786 A | * | 12/1988 | Suter | ................ B65G 49/0468 |
| | | | | 118/425 |
| 5,138,182 A | | 8/1992 | Kokubu | |
| 5,283,506 A | * | 2/1994 | Hoffmann | ............... B65B 57/16 |
| | | | | 318/77 |
| 5,395,104 A | * | 3/1995 | Harada | .................. G03G 15/60 |
| | | | | 271/225 |

(Continued)

FOREIGN PATENT DOCUMENTS

| | | |
|---|---|---|
| JP | 2000-166269 A | 6/2000 |
| JP | 2001-225946 | 8/2001 |

(Continued)

OTHER PUBLICATIONS

Search Report issued Jan. 13, 2016 in counterpart application GB1421831.7.

(Continued)

*Primary Examiner* — David S Luo
(74) *Attorney, Agent, or Firm* — Wood, Phillips, Katz, Clark & Mortimer

(57) ABSTRACT

In a transfer apparatus, a lifting unit has a lifting mechanism having a plurality of combined members and a motor. The lifting mechanism converts the rotation force of the motor to movement in the lifting direction, transmits the movement to at least one of first and second conveyors, raises or lowers at least one of first and second conveyors, and stops rotation of the motor when one of conveying paths reaches a predetermined height. In that process, a physical limit identification operation is executed in which the motor is rotated to operate the lifting mechanism to a physical operation limit (Continued)

and is then stopped, and control of the motor is changed so that the motor is rotated at low speed until the lifting mechanism reaches the physical operation limit.

20 Claims, 10 Drawing Sheets

(56) References Cited

U.S. PATENT DOCUMENTS

| | | | |
|---|---|---|---|
| 6,360,876 B1 * | 3/2002 | Nohl | B65G 69/10 198/302 |
| 6,826,849 B1 * | 12/2004 | Millonzi | F26B 15/14 34/187 |
| 7,168,549 B1 * | 1/2007 | Harrison | B62D 65/06 198/346.2 |
| 7,571,907 B2 * | 8/2009 | Shinyama | B41J 29/38 271/114 |
| 2012/0048678 A1 | 3/2012 | Itoh et al. | |

FOREIGN PATENT DOCUMENTS

| | | |
|---|---|---|
| JP | 2006-044818 A | 2/2006 |
| JP | 2010-137931 A | 6/2010 |
| JP | 2012-051679 | 3/2012 |

OTHER PUBLICATIONS

UK Search Report, Application No. GB1421831.7, issued May 26, 2015.

* cited by examiner

FORWARD ROTATION AT HALF SPEED

FORCEFUL STOP

REVERSE ROTATION AT FULL SPEED

BRAKING

REVERSE ROTATION AT VERY LOW SPEED

FORCEFUL STOP

TRANSFER APPARATUS AND POSITIONING METHOD OF DEVICE HAVING MOTOR

TECHNICAL FIELD

The present invention relates to a transfer apparatus configuring part of a conveyor line. More specifically, the present invention relates to a transfer apparatus which can switch the conveying direction of an article to be conveyed to the direction crossing the feeding direction. In addition, the present invention relates to a positioning method of a device having a motor.

BACKGROUND ART

Conveyor lines are often used for conveying articles to be conveyed in product assembling lines and article delivery centers. For instance, in the article delivery centers, a large number of conveyor lines are installed in a matrix so that transfer apparatuses are arranged in the positions where the conveyor lines cross each other. Each transfer apparatus takes out an article from one conveyor line (a first conveyor line), and then transfers it to the other conveyor line (a second conveyor line).

To achieve the above functions, the transfer apparatus has two conveyors which convey an article, and a lifting unit which changes the height of each conveyor. The lifting unit has a lifting mechanism which has a crank, a cam, a screw, and a gear. The lifting mechanism is driven by e.g., a motor.

The conveyors each have a conveying path which places thereon an article to be conveyed and conveys it. The conveying paths of the conveyors are different in conveying direction from each other. The transfer apparatus can change the relative height of the conveying paths by the lifting unit.

In such a transfer apparatus, the lifting unit retracts the conveying path of the conveyor not associated with conveyance to below the other conveying path, and lifts and exposes the conveying path of the conveyor contributing to conveyance, thereby holding its height. The lifted conveyor is then operated. Smooth conveyance is thus enabled without being interfered by the conveyor not associated with conveyance.

As described above, the transfer apparatus is required to maintain the conveyor contributing to conveyance in the raised state.

Therefore, the conventional transfer apparatus has a sensor or a limit switch which directly or indirectly senses the height of each conveyor. The motor is driven to move one of the conveyors upward, and is then stopped when the sensor or the limit switch senses that the conveyer has reached a predetermined height. As a result, the lifting unit is stopped in a state where the conveying path of the one conveyor is exposed above the conveying path of the other conveyor.

In addition, a configuration in which the sensor or the limit switch is used to sense the position of a driven body and rotation of the motor is then stopped when the position of the driven body reaches a predetermined position is not limited to the transfer apparatus, and is applied to other machines.

SUMMARY OF INVENTION

Technical Problem

In the conventional transfer apparatus, the sensor or the limit switch which senses the height of each conveyor is required, resulting in increasing the number of components. In addition, it is necessary to perform position adjustment and wiring of the sensor or the limit switch, which complicates assembling and adjustment. Further, in the conventional transfer apparatus, the sensor or the limit switch can fail. The sensor or the limit switch which is often provided in the back position of the transfer apparatus is difficult to replace. Therefore, the sensor or the limit switch is required to be eliminated.

Accordingly, to eliminate the sensor, the present inventors have contrived and prototyped a configuration in which one of the conveyors is physically collided with a certain member when its height reaches a predetermined height and the motor is then forcefully stopped. That is, the present inventors have proposed a configuration in which the motor is rotated to operate the lifting mechanism to a physical operation limit and is then forcefully stopped and at this time, the one conveyor is at the predetermined height.

However, in the transfer apparatus, when the rotation speed of the motor at the time of stopping is high, collision noise and roar of the motor are caused to give a sense of discomfort to the user. In addition, an disadvantage of excessive load is applied onto a mechanical element, such as a gear, and an overcurrent flows into the motor. There is the possibility of lowering the durability of the transfer apparatus.

Accordingly, by noting the above problems, an object of the present invention is to develop a transfer apparatus which can eliminate a sensor or a limit switch, make collision noise and roar of a motor smaller, and lower the possibility of lowering durability.

In addition, by adopting the invention in a horizontal business network, another object of the present invention is to develop a positioning method which can reduce the disadvantage of an excessive load onto a mechanical element, such as a gear, and flow of an overcurrent into a motor.

Solution to Problem

To solve the above problems, an aspect of the present invention provides a transfer apparatus which has a first conveyor, a second conveyor, and a lifting unit which raises and lowers at least one of the first and second conveyors, the first conveyor having a first conveying path located in a fixed planar region and conveying an article to be conveyed in a fixed direction, the second conveyor having a second conveying path arranged in the same planar region as the first conveying path and conveying the article to be conveyed in a direction crossing a conveying direction of the first conveying path, the lifting unit raising one of the conveying paths to above the other conveying path to convey the article to be conveyed in a predetermined direction. The lifting unit has a lifting mechanism having a plurality of combined members, and a motor, the lifting mechanism converting a rotation force of the motor to movement in a lifting direction, transmitting the movement to at least one of the first and second conveyors, raising or lowering at least one of the first and second conveyors, and stopping rotation of the motor when the one conveying path reaches a predetermined height, and in process operating the lifting unit, a physical limit identification operation is executed in which the motor is rotated to operate the lifting mechanism to a physical operation limit and is then stopped, and control of the motor is changed so that the motor is rotated at low speed until the lifting mechanism reaches the physical operation limit.

In the physical limit identification operation of the transfer apparatus, the number of rotations of the motor is lowered until the lifting mechanism reaches the physical operation limit. Thus, collision when the lifting mechanism reaches the physical operation limit is small, so that collision noise is small. In addition, the possibility of an overcurrent flowing into the motor is low. Thus, in the transfer apparatus of the present invention, the possibility of lowering durability is low.

In addition to the above aspect, desirably, the motor is finally stopped when a rotation state of the motor at the physical operation limit is a rotation origin of the motor or when a rotation state in which rotation of the motor is returned by a predetermined number of rotations from the physical operation limit is the rotation origin of the motor, and when the rotation state of the motor is at the rotation origin, the one conveying path is raised to above the other conveying path.

In addition to the above aspect, desirably, the transfer apparatus further has an electric current sensing unit which senses an electric current flowing into the motor, in which in the physical limit identification operation, the motor to which inertia is added is rotated, and a position where the electric current flowing into the motor changes abruptly or a position where the electric current flowing into the motor exceeds a fixed value is the physical operation limit.

Here, "the electric current flowing into the motor" may be an electric current supplied from outside to the motor, or an electric current generated by the motor itself.

When the lifting mechanism reaches the physical operation limit to forcefully stop the motor, a load applied onto the motor increases to change the electric current flowing into the motor. Therefore, when the electric current flowing into the motor changes abruptly or exceeds the fixed value, the fact that the lifting mechanism has reached the physical operation limit is detected.

In addition, in the physical limit identification operation of the transfer apparatus of this aspect, the motor to which inertia is added is rotated. The electric current flowing into the motor thus becomes very small. Even when the lifting mechanism reaches the physical operation limit to forcefully stop the motor, the electric current flowing from the power source into the motor is small. Therefore, damaging to the motor and reduction of the life of the motor can be prevented.

In addition to the above aspect, desirably, in the physical limit identification operation, the motor is rotated by inertia to generate electricity so that the electric current is substantially unsupplied from outside to the motor.

In the transfer apparatus of this aspect, the electric current is substantially unsupplied from outside to the motor. Therefore, even when the lifting mechanism reaches the physical operation limit to forcefully stop the motor, the electric current flowing from the power source into the motor is small. Therefore, damaging to the motor and reduction of the life of the motor can be prevented.

In addition to the above aspect, desirably, the transfer apparatus further has an electric current sensing unit which senses an electric current flowing into the motor, in which a position where the electric current flowing into the motor exceeds a fixed value is the physical operation limit.

The transfer apparatus of this aspect is accurate as the physical operation limit is recognized from the electric current value.

In addition to the above aspect, desirably, the transfer apparatus further has the physical operation limit includes an advancing-side physical operation limit and a returning-side physical operation limit, in which the motor is rotated forward and reversely so that the lifting mechanism is made to reach the physical operation limits, and the motor is rotated at low speed at least when the lifting mechanism is made to reach the advancing-side physical operation limit or when the lifting mechanism is made to reach the returning-side physical operation limit.

In the transfer apparatus of this aspect, the advancing-side physical operation limit and the returning-side physical operation limit are identified. Positioning in a state where the first conveying path is raised and positioning in a state where the second conveying path is raised can thus be performed.

In addition to the above aspect, desirably, the transfer apparatus further has a number-of-rotations sensing unit which senses the number of rotations of the motor, in which the physical operation limit includes an advancing-side physical operation limit and a returning-side physical operation limit, in which the number of rotations of the motor sensed by the number-of-rotations sensing unit is monitored when the lifting mechanism is made to reach from one of the physical operation limits to the other physical operation limit, and the motor is rotated at low speed after the number of rotations of the motor exceeds a predetermined value.

In addition to the above aspect, desirably, the transfer apparatus further has the physical operation limit includes an advancing-side physical operation limit and a returning-side physical operation limit, in which the motor is rotated at a fixed initial speed when the lifting mechanism is made to reach from one of the physical operation limits to the other physical operation limit, is then braked temporarily, and is further rotated at a speed lower than the initial speed.

In addition to the above aspect, desirably, an initial operation is executed under fixed conditions, and in the initial operation, the motor is rotated at a rotation speed lower than a normal rotation speed to operate the lifting mechanism to the physical operation limit and is then stopped.

In addition to the above aspect, desirably, the lifting mechanism has a pinion gear, a rack, a cam linearly moved by the rack, and a cam follower provided in the first or second conveyor, each end of the rack being each physical operation limit.

This aspect limits the specific configuration of the transfer apparatus.

The present invention provides a positioning method of a device having a motor in which a driven body is brought into a predetermined position or posture in such a manner that a rotation force of the motor is transmitted to operate the driven body and the motor is stopped when the driven body reaches the predetermined position. The method includes, in a process of finally stopping the motor, executing a physical limit identification operation in which the motor is rotated to operate the driven body to a physical operation limit and is then stopped, and in a physical limit identification operation, changing control of the motor so that the motor is rotated at low speed after started, monitoring an electric current flowing into the motor, and stopping the motor in a position where the electric current flowing into the motor changes abruptly or a position where the electric current flowing into the motor exceeds a fixed value.

Desirably, when control of the motor is changed so that the motor is rotated at low speed, the motor to which inertia is added is rotated.

In the positioning method of the present invention, the number of rotations of the motor is lowered until the driven body reaches the physical operation limit. In particular, in the physical limit identification operation of the present invention, the motor to which inertia is added is rotated. The electric current flowing into the motor thus becomes very small. Even when the driven body reaches the physical operation limit to forcefully stop the motor, the electric current flowing from the power source into the motor is small. Therefore, damaging to the motor and reduction of the life of the motor can be prevented.

Desirably, in the physical limit identification operation, the motor is rotated by inertia to generate electricity so that the electric current is substantially unsupplied from outside to the motor.

Desirably, the physical operation limit includes an advancing-side physical operation limit and a returning-side physical operation limit, in which the number of rotations of the motor is monitored when the driven body is made to reach from one of the physical operation limits to the other physical operation limit, and the motor is rotated at low speed after the number of rotations of the motor exceeds a predetermined value.

Desirably, the physical operation limit includes an advancing-side physical operation limit and a returning-side physical operation limit, in which the motor is rotated at a fixed initial speed when the driven body is made to reach from one of the physical operation limits to the other physical operation limit, and then the motor is braked temporarily and is further rotated at a speed lower than the initial speed.

In addition, the present invention provides a positioning method of a device having a motor in which a driven body is brought into a predetermined position or posture in such a manner that a rotation force of the motor is transmitted to operate the driven body and the motor is stopped when the driven body reaches the predetermined position, in which in an advancing-side physical operation limit and a returning-side physical operation limit, the motor which has been started to be rotated forward and reversely is unrotatable any more, the motor is rotated at a fixed initial speed when the driven body is made to reach from one of the physical operation limits to the other physical operation limit and then the motor is rotated at a speed lower than the initial speed, and an electric current flowing into the motor is monitored, and the motor is stopped in a position where the electric current flowing into the motor changes abruptly or when the electric current flowing into the motor exceeds a fixed value.

Effect of the Invention

The transfer apparatus of the present invention can move each conveyor to the predetermined height without using the sensor or the limit switch. In addition, in the transfer apparatus of the present invention, collision noise and roar of the motor are small, and the possibility of lowering durability is low.

This is the same for the positioning method of the device having the motor of the present invention. Collision noise and roar of the motor are small, and the possibility of lowering durability is low.

BRIEF DESCRIPTION OF DRAWINGS

FIGS. 6A to 6C are explanatory views showing the relation between the first and second conveyors and each horizontally moving member when the conveyors are in the raising position, in which FIG. 6A shows a state of the first conveyor, FIG. 6B shows a state of the second conveyor, and FIG. 6C shows the relation between cam followers belonging to the conveyors and the horizontally moving member;

FIGS. 7A to 7C are explanatory views showing the relation between the first and second conveyors and each horizontally moving member when the first conveyor is in the raising position and the second conveyor is in the lowering position, in which FIG. 7A shows a state of the first conveyor, FIG. 7B shows a state of the second conveyor, and FIG. 7C shows the relation between the cam followers belonging to the conveyors and the horizontally moving member;

FIGS. 8A to 8C are explanatory views showing the relation between the first and second conveyors and each horizontally moving member when the first conveyor is in the lowering position and the second conveyor is in the raising position, in which FIG. 8A shows a state of the first conveyor, FIG. 8B shows a state of the second conveyor, and FIG. 8C shows the relation between the cam followers belonging to the conveyors and the horizontally moving member;

MODES FOR CARRYING OUT INVENTION

Hereinafter, a transfer apparatus 1 of an embodiment of the present invention will be described.

Figure 1:
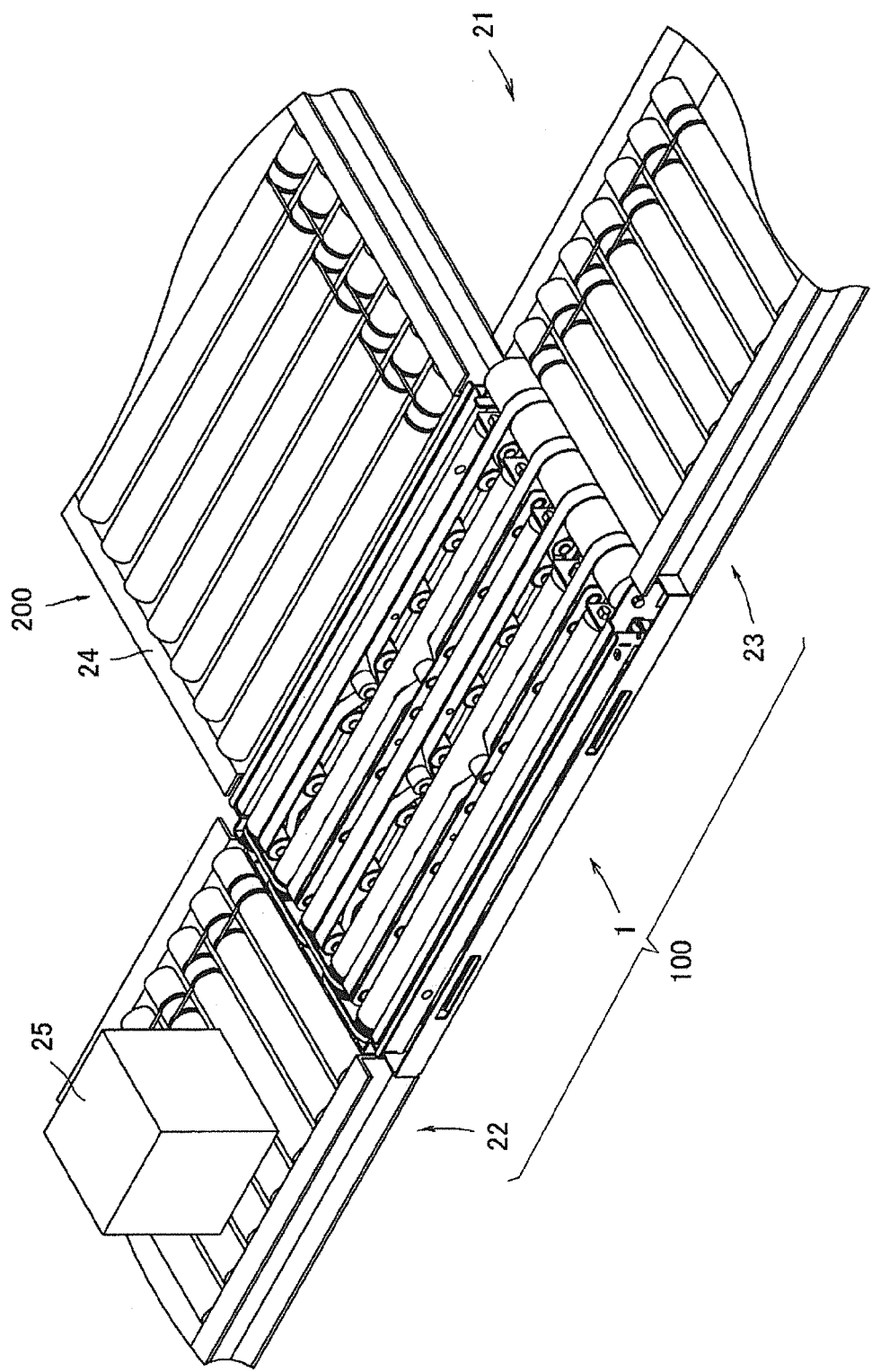
FIG. 1 is a perspective view of a conveyor line having a transfer apparatus of an embodiment of the present invention.

The transfer apparatus 1 of the embodiment of the present invention is used for a conveyor line 21 having branch paths shown in FIG. 1.

As shown in FIG. 1, the transfer apparatus 1 of the embodiment of the present invention is arranged in the portion in which the conveying paths of the conveyor line 21 cross each other (or branch from each other). That is, the transfer apparatus 1 is arranged between a first conveying line 22 on the upstream side and a first conveying line 23 on the downstream side, which are arranged linearly, thereby forming a first line 100. A second conveying line 24 orthogonal to the first conveying lines 22 and 23 is connected to the transfer apparatus 1.

Therefore, the conveyor line 21 can convey an article 25 along the first line 100 (the first conveying lines 22 and 23), change the conveying direction on the transfer apparatus 1, and convey the article 25 along a second line 200 (the second conveying line 24).

Each of the first conveying lines 22 and 23 and the second conveying line 24 is a roller conveyor having a plurality of rollers so that a drive roller transmits power to a plurality of follower rollers which are then rotated. Therefore, each of the first conveying lines 22 and 23 and the second conveying line 24 can convey the article 25 placed thereon in one direction.

The transfer apparatus 1 has a mechanical structure and a controller. As shown in FIGS. 2 to 5, the mechanical structure of the transfer apparatus 1 has a second conveyor 2, a first conveyor 3, and a lifting unit 6. The lifting unit 6 has a lifting mechanism 8, and a geared motor 5.

Figure 3:
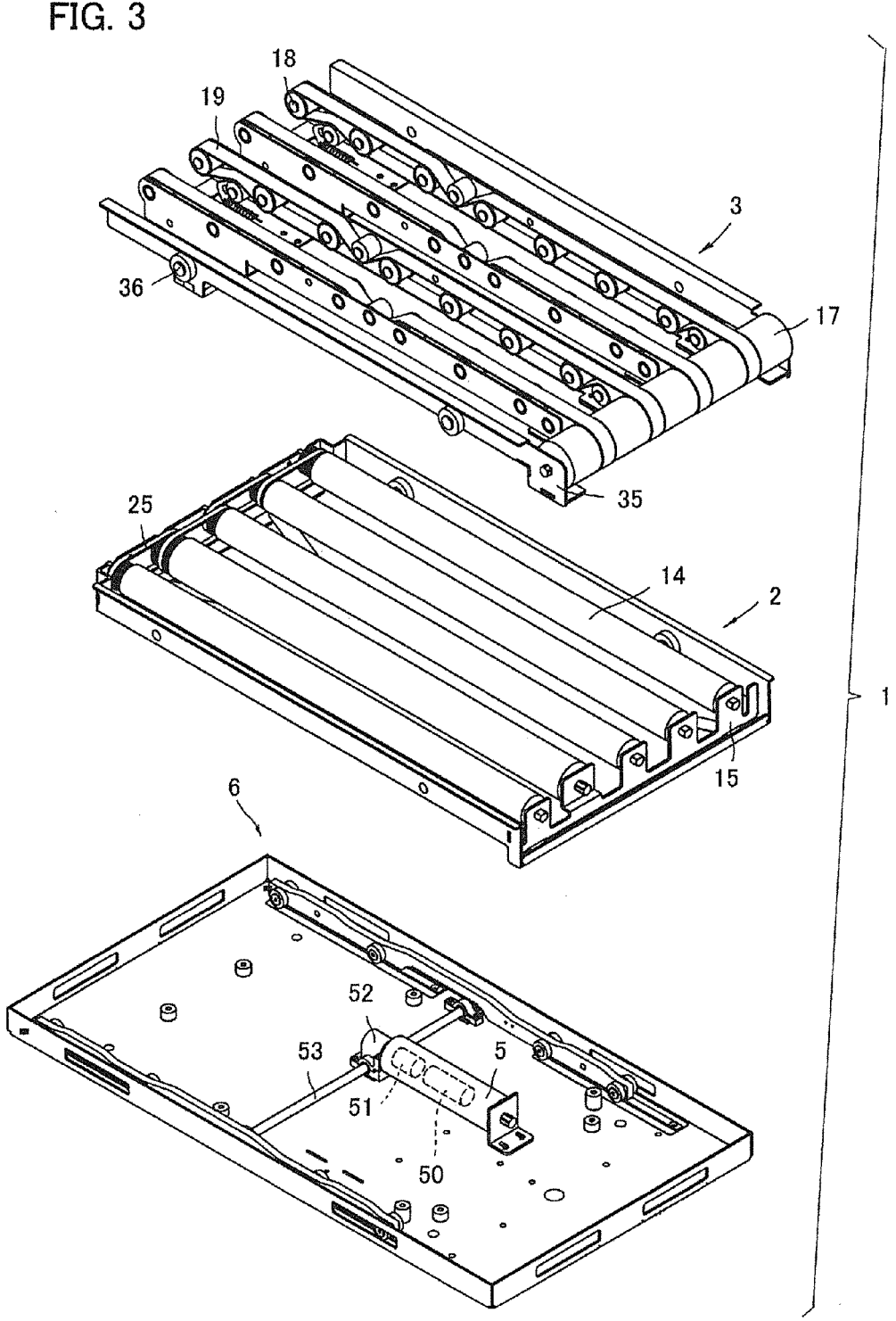
FIG. 3 is an exploded perspective view of the transfer apparatus of the embodiment of the present invention.
Figure 4:
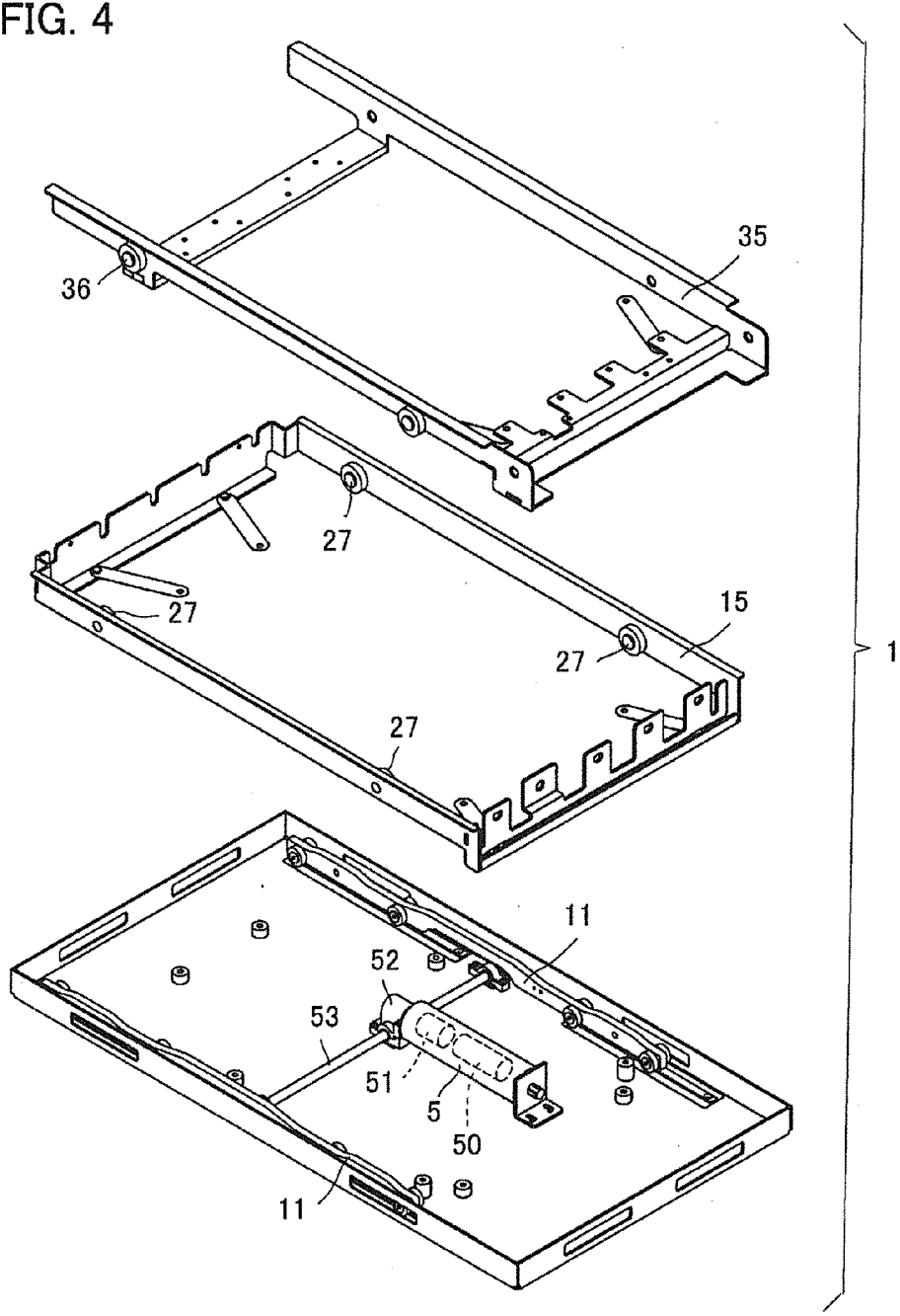
FIG. 4 is an exploded perspective view of the transfer apparatus in which belts of a first conveyor and rollers of a second conveyor are eliminated from the exploded perspective view of FIG. 3, only frames of the conveyors being shown.

As shown in FIG. 3, the second conveyor 2 of the transfer apparatus 1 has a plurality of conveying rollers 14, and a roller-side frame member 15 rotatably supporting the conveying rollers 14. As shown in FIG. 4, in the lower portion of the roller-side frame member 15, four rollers (cam followers) 27 are provided. The second conveyor 2 is a unit in which the plurality of conveying rollers 14 and the four rollers (cam followers) 27 are integrated on the roller-side frame member 15. The roller-side frame member 15 can be reciprocated only in the up and down directions along a guide which is not shown.

In addition, at least one of the plurality of conveying rollers 14 is the drive roller, and the others are the follower rollers so that the drive roller transmits power to the follower rollers by belts. The second conveyor 2 is formed with a conveying path (a second conveying path) by the plurality of conveying rollers 14. The article 25 placed on the conveying path is conveyed by rotation of the conveying rollers 14.

The first conveyor 3 will be described. The first conveyor 3 has a belt drive roller 17, a plurality of belt follower pulleys 18, annular belts 19 extended between the rollers, and a belt-side frame member 35.

On the outer side of the lower portion of the belt-side frame member 35, four rollers (cam followers) 36 are provided. The first conveyor 3 is a unit in which the belt drive roller 17 and the four rollers (cam followers) 36 are integrated on the belt-side frame member 35.

The belt drive roller 17 is a motor-incorporated roller, and has a motor, not shown, having a speed reduction mechanism in a rotatable outer cylinder. Therefore, when the motor is driven, the outer cylinder is rotated.

The belt-side frame member 35 can be reciprocated only in the up and down directions along the guide which is not shown.

The first conveyor 3 is formed with a conveying path (a first conveying path) by the belts 19. The article 25 placed on the conveying path is conveyed by running the annular belts 19.

Figure 2:
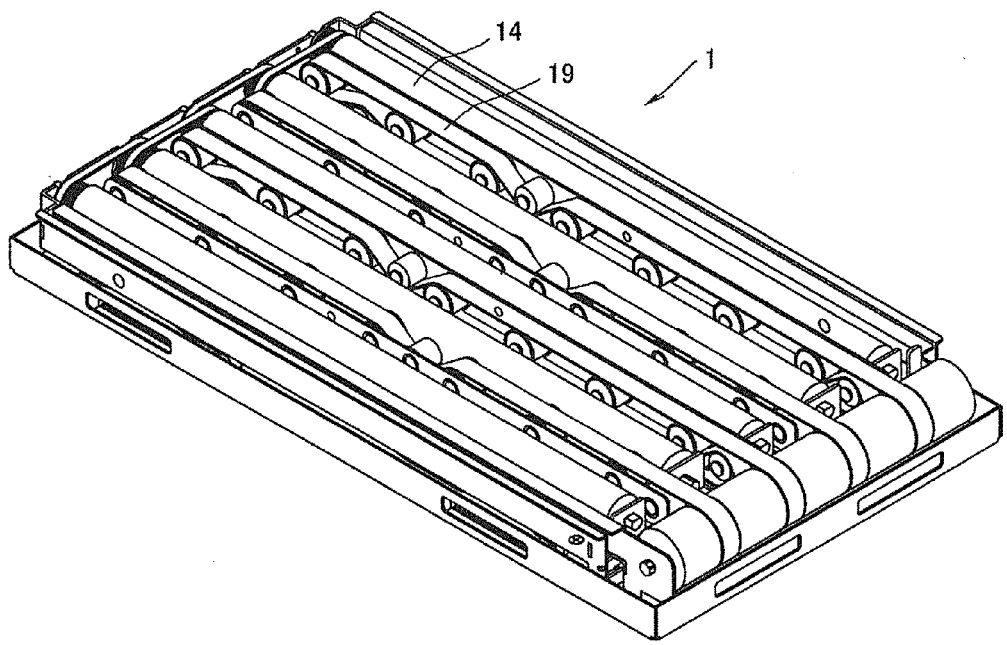
FIG. 2 is a perspective view of the transfer apparatus of the embodiment of the present invention.

As shown in FIGS. 1 and 2, the conveying paths of the first conveyor 3 and the second conveyor 2 are arranged in the same planar region. That is, between the conveying rollers 14 of the second conveyor 2, the belts 19 of the first conveyor 3 are arranged, so that the conveying paths are in the same, planar region.

The lifting unit 6 will be described. In this embodiment, the lifting unit 6 has the lifting mechanism 8 having a plurality of combined members, and the geared motor 5.

As is well known, the geared motor (FIG. 5) 5 has a motor 50 integrated with a speed reducer 51. Hereinafter, to distinguish the entire geared motor 5 from the inner motor 50, the inner motor 50 is referred to as a lifting motor 50.

In this embodiment, the lifting motor 50 is a brushless motor incorporating a permanent magnet and a coil. In addition, the lifting motor 50 incorporates a hall element (not shown) which senses the rotation position of a rotor, and can count the number of rotations of the rotor. In this embodiment, a number-of-rotations sensing unit which senses the number of rotations of the lifting motor 50 is constituted by the hall element.

In addition, since the lifting motor 50 adopted in this embodiment incorporates a permanent magnet and a coil, an electric current is generated in the coil when the rotor is rotated by an external force. That is, the lifting motor 50 adopted in this embodiment functions as an electric generator when the rotor is rotated by an external force.

Specifically, the lifting mechanism 8 has a gear train 52, a drive shaft 53, pinion gears 55, two horizontally moving members 11, the cam followers 27 belonging to the second conveyor 2, and the cam followers 36 belonging to the first conveyor 3.

The drive shaft 53 is arranged in the direction crossing the outer shaft of the geared motor 5, and has both ends extended to the proximity of both ends of the transfer apparatus 1 so that the pinion gears 55 are mounted at the ends thereof.

Figure 5:
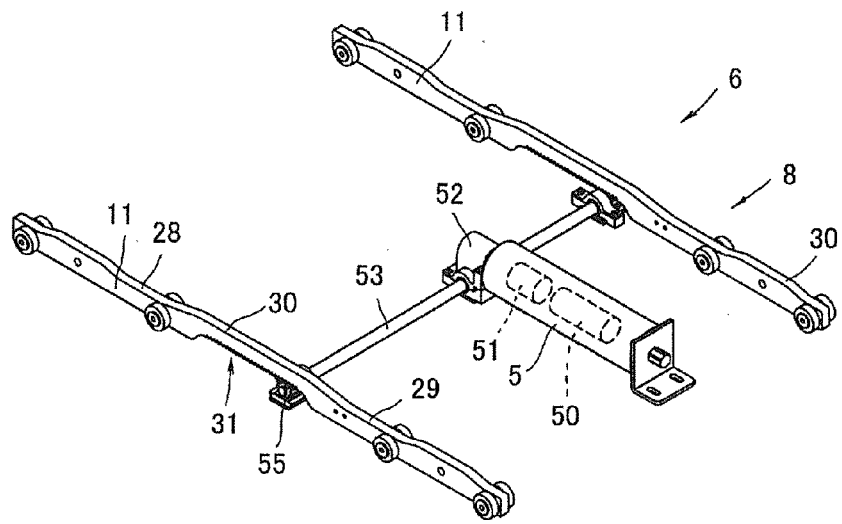
FIG. 5 is a perspective view of a lifting mechanism and a geared motor of the transfer apparatus of FIG. 2.

As shown in FIG. 5, the gear train 52 connects the output shaft of the geared motor 5 and the intermediate portion of the drive shaft 53. The gear train 52 transmits the rotation force of the geared motor 5 to the drive shaft 53. Therefore, when the geared motor 5 is rotated, the pinion gears 55 mounted at the ends of the drive shaft 53 are rotated.

In this embodiment, between the roller-side frame member 15 and the belt-side frame member 35, the horizontally moving members 11 are arranged in parallel. The horizontally moving members 11 can be reciprocated only in the longitudinal direction along the guide which is not shown.

Figure 6A:
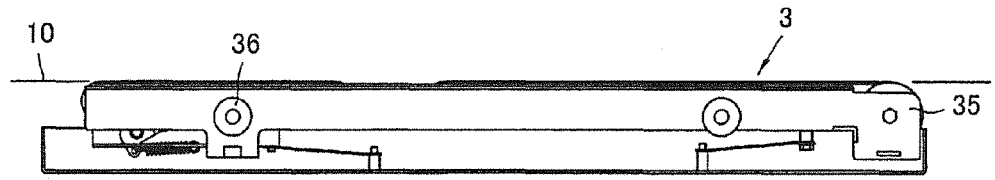
Figure 6B:
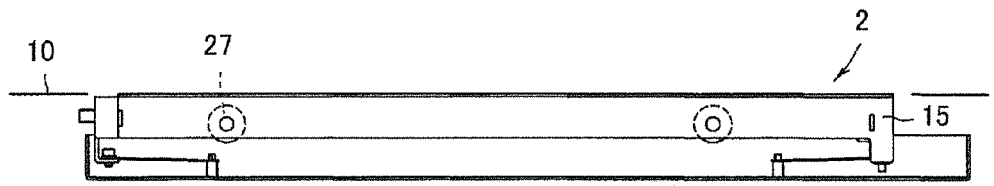
Figure 6C:
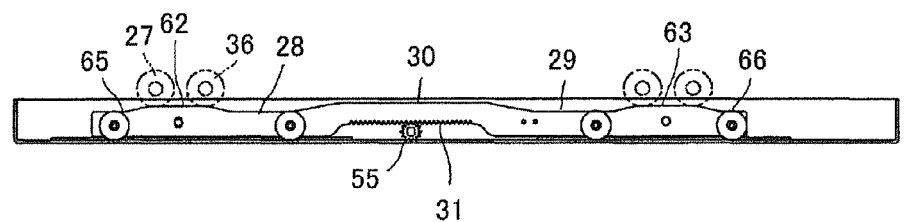

As shown in FIGS. 5 and 6C, each of the horizontally moving members 11 is a translation cam and has a long linear portion 30. At the center and on the lower surface of the linear portion 30, a rack 31 is provided.

Each of the pinion gears 55 is engaged with the rack 31. Power is transmitted from the pinion gear 55 rotated forward and reversely, so that the horizontally moving member 11 is reciprocated horizontally. That is, by rotating the geared motor 5, power is transmitted to the horizontally moving member 11 which is then reciprocated along the guide which is not shown.

In addition, as described above, the horizontally moving member 11 is a translation cam. On the upper surface of the linear portion 30, plateau-like portions 62 and 63 and cam recesses 65, 28, 29, and 66 are provided. That is, the cam recesses 65 and 28 are provided on both sides of the plateau-like portion 62, and the cam recesses 29 and 66 are provided on both sides of the plateau-like portion 63.

One combination of the plateau-like portion 62 and the cam recesses 65 and 28 is provided on one side of the rack 31, and the other combination of the plateau-like portion 63 and the cam recesses 29 and 66 is provided on the other side of the rack 31. The cam recesses 65, 28, 29, and 66 are provided on both sides of the rack 31. The cam followers 27 provided on the roller-side frame member 15 are fitted into the cam recesses 65 and 29, and the cam followers 36 provided on the belt-side frame member 35 are fitted into the cam recesses 28 and 66.

Figure 7A:
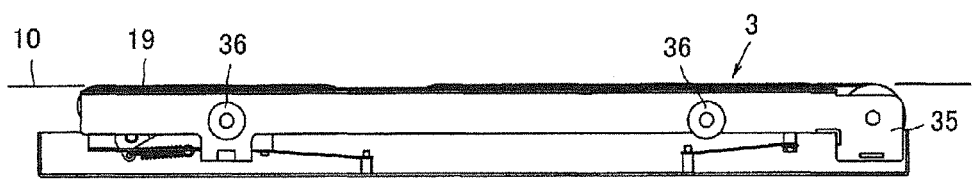
Figure 7B:
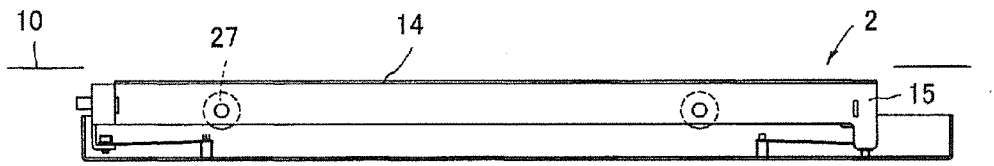
Figure 7C:
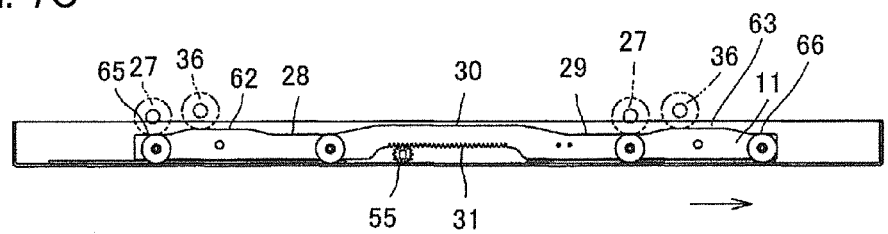

That is, when the geared motor 5 is rotated to rotate the pinion gear 55, the linear portion 30 of the horizontally moving member 11 is moved horizontally while rotating the cam followers 27. Then, when the cam recesses 65 and 29 approach the cam followers 27, the cam followers 27 on the plateau-like portions 62 and 63 as shown in FIG. 6C are dropped into the cam recesses 65 and 29 as shown in FIG. 7C. As a result, as shown in FIG. 7B, the roller-side frame member 15 integrated with the cam followers 27 is lowered to move the second conveyor 2 downward. On the other hand, the cam followers 36 of the first conveyor 3 remain on the plateau-like portions 62 and 63, so that as shown in FIG. 7A, the first conveyor 3 remains in the raising position.

At this time, the pinion gear 55 reaches one end of the rack 31. That is, the pinion gear 55 reaches a physical operation limit and is unrotatable any more.

Figure 8A:
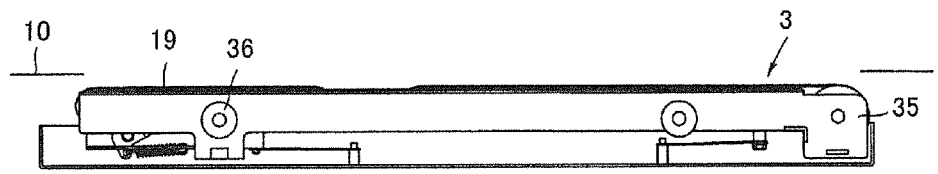
Figure 8B:
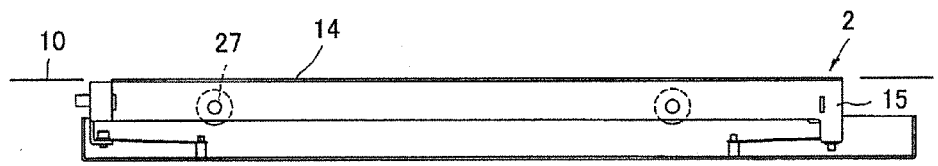
Figure 8C:
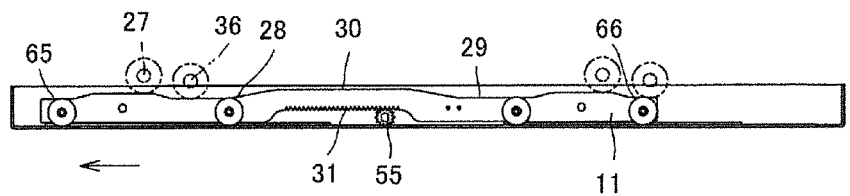

Similarly, when the geared motor 5 is rotated to rotate the pinion gear 55, the horizontally moving member 11 is moved horizontally. Then, the cam followers 36 on the plateau-like portions 62 and 63 of the belt-side frame member 35 as shown in FIG. 6C are dropped into the cam recesses 28 and 66 as shown in FIG. 8C. As a result, as shown in FIG. 8A, the belt-side frame member 35 is lowered to move the first conveyor 3 downward. On the other hand, the cam followers 27 of the second conveyor 2 remain on the plateau-like portions 62 and 63, so that as shown in FIG. 8B, the second conveyor 2 remains in the raising position.

At this time, the pinion gear 55 reaches the other end of the rack 31. That is, the pinion gear 55 reaches the physical operation limit and is unrotatable any more.

As described above, when the geared motor 5 is rotated, the pinion gear 55 mounted at each end of the drive shaft 53 is rotated to move the horizontally moving member 11. By rotating the geared motor 5, the first conveyor 3 or the second conveyor 2 is raised and lowered. That is, when the pinion gear 55 is rotated in one direction to reach the end of the rack 31 so that that the pinion gear 55 and motor 5 are mechanically blocked against rotation at the physical operation limit, the first conveyor 3 is stopped in the raising position. On the other hand, when the pinion gear 55 is rotated in the other direction and the pinion gear 55 and motor 5 are mechanically blocked against rotation at the physical operation limit, the second conveyor 2 is stopped in the raising position.

Figure 12:
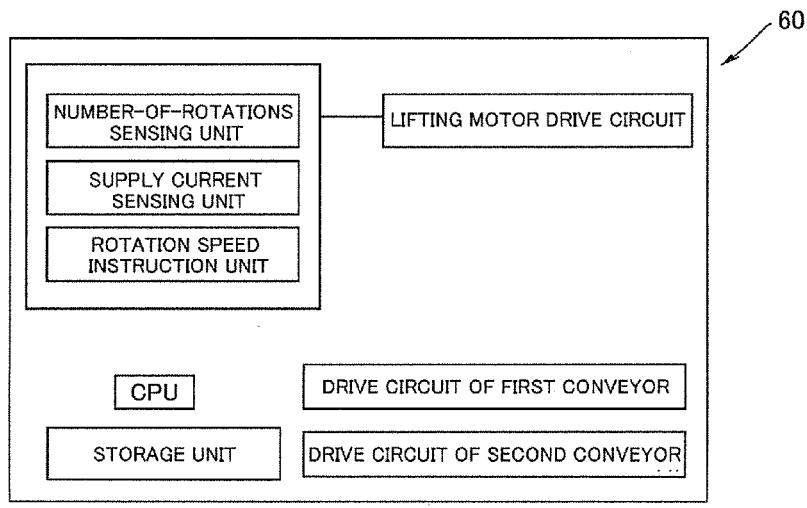
FIG. 12 is a block diagram of a controller of the transfer apparatus of the embodiment of the present invention.

In this embodiment, the mechanical structure of the transfer apparatus 1 is controlled by a controller 60 shown in FIG. 12.

The controller 60 has a drive circuit of the first conveyor which drives the belt drive roller 17 of the first conveyor 3, a drive circuit of the second conveyor which drives the drive roller of the second conveyor 2, and a lifting motor drive circuit which drives the lifting motor 50 of the lifting unit 6.

In addition, the controller 60 has the number-of-rotations sensing unit which senses the number of rotations of the lifting motor 50, a supply current sensing unit which senses an electric current value supplied into the lifting motor 50, and a rotation speed instruction unit which determines and instructs the rotation speed of the lifting motor 50.

In this embodiment, when the first conveyor 3 or the second conveyor 2 is raised and lowered, the lifting motor 50 of the lifting unit 6 is rotated. The pinion gear 55 is rotated, and the motor is then stopped when the pinion gear 55 reaches the physical operation limit. Specifically, the supply current sensing unit senses the electric current value supplied into the lifting motor 50 being rotated to determine that the pinion gear 55 has reached the physical operation limit when the electric current value changes abruptly to be a fixed value, thereby stopping the lifting motor 50.

In the process of operating the lifting unit 6 of this embodiment, the following operation (hereinafter, called a physical limit identification operation) is executed. The lifting motor 50 is rotated to operate the lifting mechanism 8 to the physical operation limit and is then stopped when the lifting mechanism 8 reaches the physical operation limit.

In this embodiment, the electric current flowing into the lifting motor 50 is sensed, and current supply into the lifting motor 50 is then stopped when the position where the electric current flowing into the lifting motor 50 exceeds the fixed value is the physical operation limit.

That is, the lifting motor 50 is rotated to rotate the pinion gear 55 to the physical operation limit, and current supply into the lifting motor 50 is then stopped when the position where the electric current flowing into the lifting motor 50 exceeds the fixed value is the physical operation limit. As a result, the horizontally moving member 11 is stopped in a state where the cam follower 36 at one side of the horizontally moving member 11 is fitted into the cam recess 28 of the linear portion 30 or in a state where the cam follower 27 at the other side of the horizontally moving member 11 is fitted into the cam recess 29 of the linear portion 30. The first conveyor 3 or the second conveyor 2 is raised and lowered so that the conveying path thereof remains in the position at a predetermined height.

As shown in FIG. 1, the transfer apparatus 1 thus configured can convey the article 25 from the first conveying line 22 to the first conveying line 23 side through the transfer apparatus 1, and convey the article 25 from the first conveying line 22 to the second conveying line 24 side through the transfer apparatus 1.

When the article 25 is conveyed to the first conveying line 23 side (that is, on the first line 100), the geared motor 5 (lifting motor 50) is driven in one direction by the instruction of the controller 60. The electric current flowing into the lifting motor 50 is then sensed. Current supply into the lifting motor 50 is stopped when the position where the electric current flowing into the lifting motor 50 exceeds the fixed value is the physical operation limit. The horizontally moving member 11 is thus moved to the position shown in FIG. 7C.

When the horizontally moving member 11 reaches the position shown in FIG. 7C, the cam followers 27 of the second conveyor 2 are dropped into the cam recesses 65 and 29.

Therefore, the roller-side frame member 15 is lowered, and as shown in FIG. 7B, the top of each conveying roller 14 (the second conveying path) is retracted downward. In that case, the cam followers 36 of the first conveyor 3 are on the plateau-like portions 62 and 63 of the horizontally moving member 11. The first conveyor 3 thus remains in the raising position, and can place the article 25 thereon. As a result, the article 25 is conveyed to the first conveying line 23 side by the belts 19 (the first conveying path).

When the article 25 is conveyed to the second conveying line 24 side (that is, on the second line 200), the geared motor 5 is rotated reversely from the instruction of the controller 60. Current supply into the lifting motor 50 is then stopped when the position where the electric current flowing into the lifting motor 50 exceeds the fixed value is the physical operation limit. The horizontally moving member 11 is thus moved to the position shown in FIG. 8C. The cam followers 36 of the first conveyor 3 are dropped into the cam recesses 28 and 66, so that the belt-side frame member 35 is lowered. As shown in FIG. 8B, the upper surface of each belt 19 is retracted to below a conveying surface 10. In that case, the cam followers 27 of the second conveyor 2 are always arranged on the linear portion 30 of the horizontally moving member 11. Each conveying roller 14 (the second conveying path) is thus arranged in the raising position, and can place the article 25 thereon. As a result, the article 25 is conveyed to the second conveying line 24 side by each conveying roller 14.

As described above, in the transfer apparatus 1 of this embodiment, the lifting motor 50 in the geared motor 5 is driven, the electric current flowing into the lifting motor 50 is sensed, and current supply into the lifting motor 50 is stopped when the position where the electric current flowing into the lifting motor 50 exceeds the fixed value is the physical operation limit. The first conveyor 3 or the second conveyor 2 is thus raised and lowered to remain in the position at the predetermined height.

In addition, the transfer apparatus 1 of this embodiment performs specific control when executing the physical limit identification operation. Hereinafter, this control will be described.

In this embodiment, there are two positions where the lifting motor 50 is forcefully stopped. That is, in this embodiment, there are two physical operation limits of the lifting mechanism 8. In this embodiment, there are an advancing-side physical operation limit in which the lifting motor 50 is rotated forward and is then stopped and a returning-side physical operation limit in which the lifting motor 50 is rotated reversely and is then stopped.

In this embodiment, the lifting motor 50 is rotated to operate the lifting mechanism 8 to each physical operation limit and is then forcefully stopped, thereby stopping current supply into the lifting motor 50.

In this embodiment, each physical operation limit is the fit limit of the rack 31 formed on the horizontally moving member 11 and the pinion gear 55 fitted on the rack 31. That is, the pinion gear 55 is rotated to linearly move the rack 31 of the horizontally moving member 11 and reaches the portion which has no teeth at each end of the rack 31, so that the pinion gear 55 is unrotatable any more. This state is each physical operation limit present at each end of the rack 31.

Figure 9:
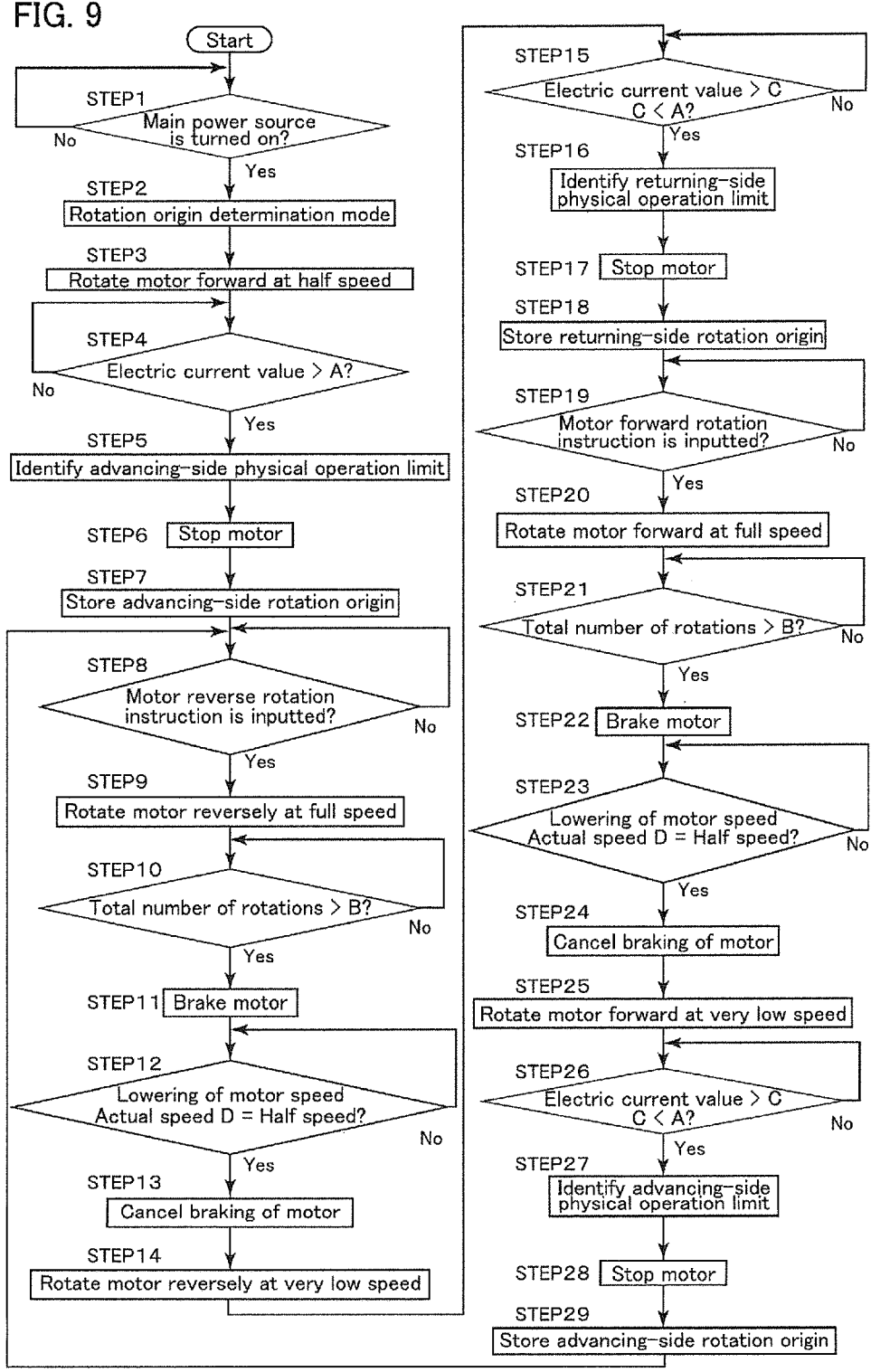
FIG. 9 is a flowchart of executing a physical limit identification operation of the transfer apparatus of FIG. 2.

The controller 60 adopted in the transfer apparatus 1 of this embodiment has a CPU and a storage unit. The storage unit stores a computer program shown in the flowchart shown in FIG. 9.

The physical limit identification operation is executed in accordance with the program.

The physical limit identification operation is executed each time the lifting unit 6 of the transfer apparatus is operated. More specifically, the physical limit identification operation is executed each time the geared motor 5 is started.

That is, in step 1, the controller 60 waits for turning-on of the main power source of the transfer apparatus 1. When the main power source is turned on, the transfer apparatus 1 is brought into a rotation origin determination mode to execute an initial operation.

In the rotation origin determination mode, in step 3, the motor 50 is rotated forward. The rotation speed at this time is lower than a normal lifting operation. For facilitating the description, the rotation speed of the lifting motor 50 in the normal lifting operation is refereed to as a full speed operation, and the rotation speed of the lifting motor 50 in step 3 is referred to as a half speed operation. Note that the half speed operation is not limited to the half speed of the full speed operation. The rotation speed of the half speed operation is approximately 20% to 70% of the rotation speed at the time of normal conveyance, and in this embodiment, is approximately 45% to 55%.

Figure 10A:
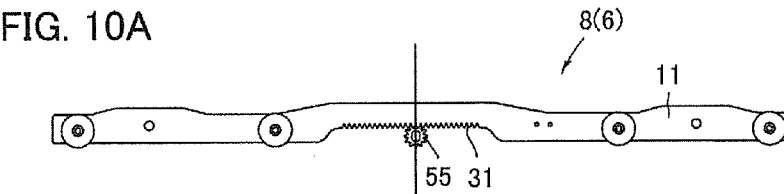
FIGS. 10A to 10G are explanatory views chronologically showing the position relation between each rack and each pinion of the transfer apparatus when the physical limit identification operation is executed.

FIG. 10A shows the relation between the pinion gear 55 and the rack 31 immediately before rotation of the lifting motor 50 is started. The pinion gear 55 is fitted into any position of the intermediate portion of the rack 31.

Figure 10B:
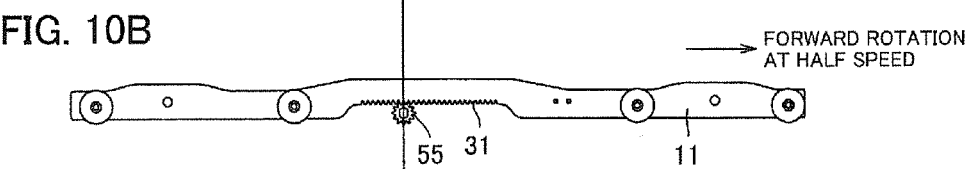
Figure 10C:
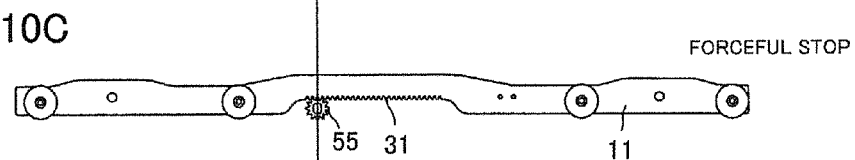
Figure 10D:
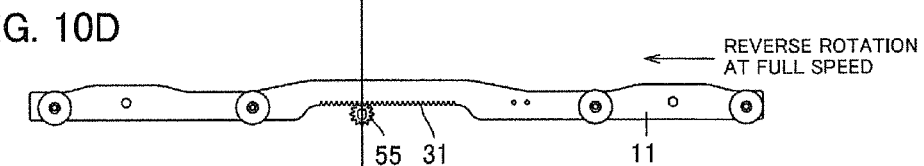

In step 3, the lifting motor 50 is rotated forward at half speed. As shown in FIG. 10B, the horizontally moving member 11 is moved to change the position of the pinion gear 55 fitted on the rack 31. Finally, as shown in FIG. 10C, the pinion gear 55 reaches one end of the rack 31 and is then forcefully stopped. That is, the lifting motor 50 is rotated to operate the lifting mechanism 8 to the advancing-side physical operation limit and is then forcefully stopped.

In this embodiment, according to the electric current value flowing into the lifting motor 50, the supply current sensing unit senses that the lifting motor 50 has stopped. That is, the lifting motor 50 whose electric current value increases with the load is rotated to operate the lifting mechanism 8 to the advancing-side physical operation limit and is then forcefully stopped. The electric current value supplied into the lifting motor 50 thus increases. Therefore, in this embodiment, the supply current sensing unit in the controller 60 monitors the electric current value supplied into the lifting motor 50 to determine that the lifting motor 50 has been forcefully stopped when the electric current value increases abruptly.

Figure 11:
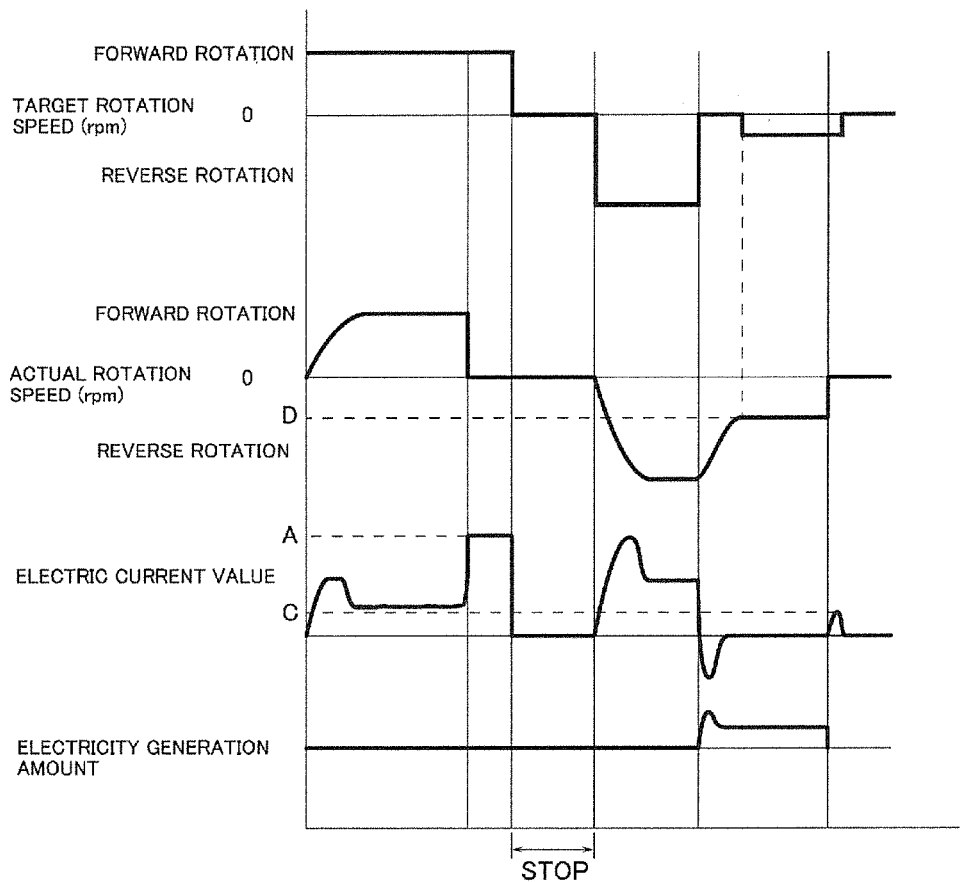
FIG. 11 is a time chart showing the relation of the target rotation speed of a lifting motor, the actual rotation speed of the lifting motor, the electric current value sensed by an electric current sensing unit, and the electricity generation amount of the lifting motor when the physical limit identification operation is executed.

That is, as shown in the time chart of FIG. 11, when the initial operation is started, the rotation speed of the lifting motor 50 becomes half. The lifting motor 50 gradually increases the number of rotations from the stop state. The electric current supplied into the lifting motor 50 is large at first but becomes gradually stable. The lifting motor 50 is then forcefully stopped when the lifting mechanism 8 reaches the advancing-side physical operation limit. As shown in the time chart of FIG. 11, the electric current supplied into the lifting motor 50 increases abruptly.

In step 4, the controller 60 senses that the electric current supplied into the lifting motor 50 has exceeded fixed value A. In step 5, the controller 60 recognizes that the lifting mechanism 8 has reached the advancing-side physical operation limit. The routine shifts to step 6, the current supply into the lifting motor 50 is stopped, thereby stopping the lifting motor 50.

In step 7, the present state of the lifting motor 50 is stored as the advancing-side rotation origin. The advancing-side rotation origin is a position where the first conveyor 3 or the second conveyor 2 is moved to the predetermined height to finally stop the lifting motor 50, and is a state where one of the conveying paths is raised to above the other conveying path.

At this time, the cam followers 27 of the second conveyor 2 are dropped into the cam recesses 65 and 29, so that the roller-side frame member 15 is lowered. As shown in FIG. 7B, the top of each conveying roller 14 (conveying path) is retracted downward. The cam followers 36 of the first conveyor 3 are on the plateau-like portions 62 and 63 of the horizontally moving member 11, and the first conveyor 3 reaches the raising position. Therefore, the first conveyor 3 is arranged in the raising position and can place the article 25 thereon.

When the article 25 to be conveyed is conveyed to the second conveying line 24 side, a central controller, not shown, issues a motor reverse rotation instruction. The controller 60 receives this signal, and then rotates the lifting motor 50 reversely at a fixed initial speed. That is, in step 8, the controller 60 waits for the motor reverse rotation instruction, and upon reception of it, reversely rotates the lifting motor 50 in step 9. Here, the rotation speed (initial speed) of the lifting motor 50 is higher than the forward rotation speed (half speed). More specifically, the lifting motor 50 is rotated reversely at a speed close to the rotation speed (full speed operation) thereof in the normal lifting operation.

Then, the number of rotations of the lifting motor 50 is counted. When the number of rotations of the lifting motor 50 is a fixed number of rotations, the routine shifts from step 10 to step 11 to brake the lifting motor 50 once.

Figure 10E:
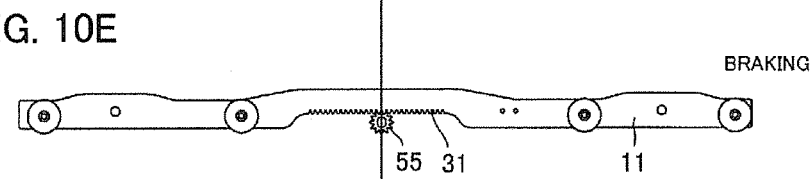
Figure 10F:
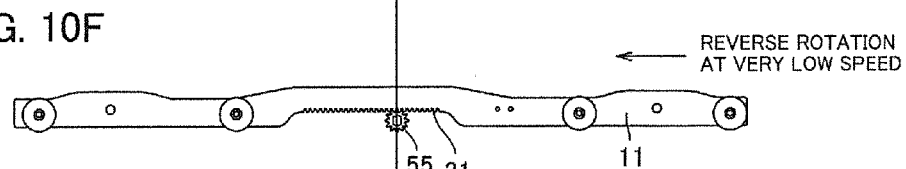

As shown in FIG. 10E, the lifting motor 50 is braked in the position until the pinion gear 55 reaches the returning-side physical operation limit. That is, since the length of the rack 31 has been known, and the lifting motor 50 starts rotation from the advancing-side physical operation limit, the rotation degree at which the pinion gear 55 reaches the returning-side physical operation limit has been known. Therefore, before the pinion gear 55 reaches the returning-side physical operation limit, the lifting motor 50 is braked once. The lifting motor 50 is desirably braked in the position closest to the returning-side physical operation limit. The braking position is desirably the position where the pinion gear 55 fitted on the rack 31 is the position of 50% or more, more desirably 70% or more, of the entire length of the rack 31.

The lifting motor 50 is braked by short-circuiting its coil. When the rotation speed of the lifting motor 50 lowers to fixed value D, the routine shifts from step 11 to step 12 to cancel the braking. Specifically, when the rotation speed of the lifting motor 50 is 60% or less and 40% or more, braking of the lifting motor 50 is canceled.

It is not preferable that the braking canceling timing is too quick or slow.

Further, the routine shifts to step 13 to rotate the lifting motor 50 at a rotation speed lower than rotation speed D. For instance, the lifting motor 50 is rotated at a speed of 50% or less, more preferably 40% or less, of the rotation speed at the time of canceling the braking. The target rotation speed of the lifting motor 50 in step 13 is lower than the initial speed.

However, since the lifting motor 50 is actually rotated at rotation speed D, the lifting motor 50 is rotated by inertia, not by the rotation force exhibited by itself. As described above, the lifting motor 50 has an electromagnet and a coil, and is rotated by an external force to generate electricity. Therefore, the voltage generated by the lifting motor 50 is higher than the voltage supplied from the controller 60. As a result, as shown in the time chart of FIG. 11, the electric current substantially does not flow from the controller 60 into the lifting motor 50.

Figure 10G:
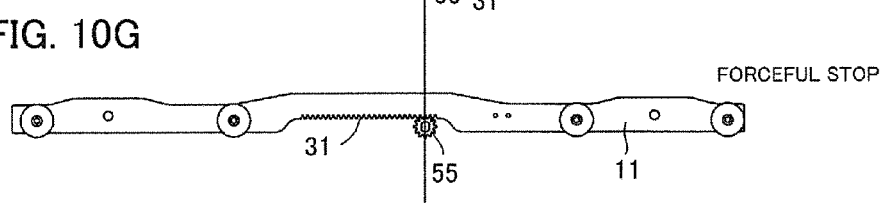

Further, the lifting motor 50 is rotated by inertia, so that as shown in FIG. 10G, it is forcefully stopped when the pinion gear 55 reaches the returning-side physical operation limit. As a result, the electric current generated by the lifting motor 50 itself is lost, and instead, the electric current flows again from the controller 60 into the lifting motor 50. At this time, the electric current increases greatly, which can be sufficiently sensed by the supply current sensing unit of the controller 60. However, since the absolute value of the electric current is small, the lifting motor 50 is not damaged.

When the electric current increase is sensed, the routine shifts from step 15 to step 16 to recognize that the pinion gear 55 has reached the returning-side physical operation limit. Then, the routine shifts to step 17 to stop current supply into the lifting motor 50, thereby stopping the lifting motor 50. In this embodiment, in step 15, whether there is fixed current value C or not is monitored. When fixed current value C is sensed, the routine shifts through step 16 to step 17 to stop current supply into the lifting motor 50, thereby stopping the lifting motor 50. Current value C as a reference value is smaller than current value A.

At this time, the belt-side frame member 35 is lowered to move the first conveyor 3 downward. On the other hand, the second conveyor 2 remains in the raising position.

Therefore, the second conveyor 2 is arranged in the raising position and can place the article 25 thereon.

In step 18, the present state of the lifting motor 50 is stored as the returning-side rotation origin.

When the pinion gear 55 reaches the returning-side physical operation limit to stop rotation, the electric current flowing from the power source into the lifting motor 50 changes abruptly. However, the absolute value of the electric current is very small. Therefore, as described above, there is no possibility of damaging the lifting motor 50. In addition, the lifting motor 50 is rotated by inertia, so that the pinion gear 55 reaches the returning-side physical operation limit, causing no large collision noise.

When the advancing-side physical operation limit is detected, no excessively large collision noise is caused since the rotation speed of the lifting motor 50 is low.

In addition, when the article 25 to be conveyed is conveyed to the first conveying line 23 side again, the central controller, not shown, issues a motor forward rotation instruction. Then, the controller 60 receives this signal to rotate the lifting motor 50 forward. That is, in step 19, the controller 60 waits for the motor forward rotation instruction, and upon reception of it, rotates the lifting motor 50 forward in step 20.

The following operation is substantially the same as steps 10 to 18. When the number of rotations of the lifting motor 50 is counted and becomes the fixed number of rotations, the routine shifts from step 21 to step 22 to brake the lifting motor 50 once.

The rotation speed of the lifting motor 50 lowers to fixed value D, the routine shifts from step 23 to step 24 to cancel the braking. Further, the routine shifts to step 25, so that the lifting motor 50 is rotated at a rotation speed lower than rotation speed D. For instance, the lifting motor 50 is rotated at a rotation speed of 50% or less, more preferably 40% or less, of the rotation speed at the time of canceling the braking.

When the electric current increase is sensed, the routine shifts from step 26 to step 27 to recognize that the pinion gear 55 has reached the advancing-side physical operation limit. Then, the routine shifts to step 28 to stop current supply into the lifting motor 50, thereby stopping the lifting motor 50. In addition, in step 29, the present state of the lifting motor 50 is stored as the advancing-side rotation origin.

At this time, the cam followers 27 of the second conveyor 2 are dropped into the cam recesses 65 and 29 so that the roller-side frame member 15 is lowered. As shown in FIG. 7B, the top of each conveying roller 14 (conveying path) is retracted downward. The cam followers 36 of the first conveyor 3 are on the linear portion 30 of the horizontally moving member 11, so that the first conveyor 3 reaches the raising position. Therefore, the first conveyor 3 is arranged in the raising position and can place the article 25 thereon.

The routine shifts to step 8 to repeat the steps after step 8.

In the above embodiment, when both the physical operation limits are detected, the lifting motor 50 is rotated by inertia. However, when one of the physical operation limits is detected, the lifting motor 50 may be rotated by inertia.

In addition, in the above embodiment, when the returning-side physical operation limit is detected, the lifting motor 50 is rotated at high speed and is then braked for speed reduction. This configuration is recommended since the time to reach the returning-side physical operation limit can be shortened. However, the present invention is not limited to this configuration. The lifting motor 50 may be rotated at an intermediate speed at first, and be then rotated at low speed from the instruction of the controller 60 for inertia rotation.

In the above embodiment, when the main power source of the transfer apparatus 1 is turned on, the rotation origin determination mode is executed. However, the rotation origin determination mode may be executed when certain abnormality occurs.

In the above embodiment, the position of one of the physical operation limits is the position where the first conveyor is lifted. However, the physical operation limit may be shifted from the position where the first conveyor is lifted. The physical operation limit is determined by member collision, so that in the position of the physical operation limit, machine element engagement is unstable. Therefore, the position where motor rotation is returned slightly may be matched with the position where the first conveyor is lifted.

In the above embodiment, each end of the rack 31 is each physical operation limit. However, the present invention is not limited to this configuration. For instance, an obstacle may be provided in the moving direction of the horizontally moving member as a translation cam to limit the horizontally moving range of the horizontally moving member, so that the moving limit of the horizontally moving member may be each physical operation limit.

In addition, in place of the translation cam, a rotation cam and a crank mechanism may form the lifting mechanism, and a certain obstacle may be provided to limit the rotation angle of the cam and the moving range of the crank member.

Further, the method of the present invention is applicable to devices other than the lifting device. For instance, since positioning is necessary when the article to be conveyed on the conveyor is conveyed a fixed distance, the positioning method of the device having the motor of the present invention can be adopted.

The invention claimed is:

1. A transfer apparatus which has a first conveyor, a second conveyor, and a lifting unit which raises and lowers at least one of the first and second conveyors, the first conveyor having a first conveying path located in a fixed planar region and conveying an article to be conveyed in a fixed direction, the second conveyor having a second conveying path arranged in the same planar region as the first conveying path and conveying the article to be conveyed in a direction crossing a conveying direction of the first conveying path, the lifting unit raising one of the conveying paths to above the other conveying path to convey the article to be conveyed in a predetermined direction,
wherein the lifting unit has a lifting mechanism having a plurality of combined members, and a motor, the lifting mechanism converting a rotation force of the motor to movement in a lifting direction, transmitting the movement to at least one of the first and second conveyors, raising or lowering at least one of the first and second conveyors, and stopping rotation of the motor when the one conveying path reaches a predetermined height, and in process of operating the lifting unit, a physical limit identification operation is executed in which the motor is rotated to operate the lifting mechanism to a physical operation limit whereupon the motor is stopped by being mechanically blocked against further rotation and current supply into the motor is stopped, and control of the motor is changed so that the motor is rotated at low speed until the lifting mechanism reaches the physical operation limit.

2. The transfer apparatus according to claim 1, wherein the motor is finally stopped when a rotation state of the motor at the physical operation limit is a rotation origin of the motor or when a rotation state in which rotation of the motor is returned by a predetermined number of rotations from the physical operation limit is the rotation origin of the motor, and when the rotation state of the motor is at the rotation origin, the one conveying path is raised to above the other conveying path.

3. The transfer apparatus according to claim 1, further comprising an electric current sensing unit which senses an electric current flowing into the motor, wherein, in the physical limit identification operation, the motor to which inertia is added is rotated, and a position where the electric current flowing into the motor changes abruptly or a position where the electric current flowing into the motor exceeds a fixed value is the physical operation limit.

4. The transfer apparatus according to claim 3, wherein in the physical limit identification operation, the motor is rotated by inertia to generate electricity so that the electric current is substantially unsupplied from outside to the motor.

5. The transfer apparatus according to claim 1, further comprising an electric current sensing unit which senses an electric current flowing into the motor,
wherein a position where the electric current flowing into the motor exceeds a fixed value is the physical operation limit.

6. The transfer apparatus according to claim 1,
wherein the physical operation limit includes an advancing-side physical operation limit and a returning-side physical operation limit,
wherein the motor is rotated forward and reversely so that the lifting mechanism is made to reach the physical operation limits, and the motor is rotated at low speed at least when the lifting mechanism is made to reach the advancing-side physical operation limit or when the lifting mechanism is made to reach the returning-side physical operation limit.

7. The transfer apparatus according to claim 1, further comprising a number-of-rotations sensing unit which senses the number of rotations of the motor,
wherein the physical operation limit includes an advancing-side physical operation limit and a returning-side physical operation limit, and
wherein the number of rotations of the motor sensed by the number-of-rotations sensing unit is monitored when the lifting mechanism is made to reach from one of the physical operation limits to the other physical operation limit, and the motor is rotated at low speed after the number of rotations of the motor exceeds a predetermined value.

8. The transfer apparatus according to claim 1,
wherein the physical operation limit includes an advancing-side physical operation limit and a returning-side physical operation limit, and
wherein the motor is rotated at a fixed initial speed when the lifting mechanism is made to reach from one of the physical operation limits to the other physical operation limit, is then braked temporarily, and is further rotated at a speed lower than the initial speed.

9. The transfer apparatus according to claim 1, wherein an initial operation is executed under fixed conditions, and in the initial operation, the motor is rotated at a rotation speed lower than a normal rotation speed to operate the lifting mechanism to the physical operation limit and is then stopped.

10. The transfer apparatus according to claim 1, wherein the lifting mechanism has a pinion gear, a rack, a cam linearly moved by the rack, and a cam follower provided in the first or second conveyor, each end of the rack being each physical operation limit.

11. A transfer apparatus which has a first conveyor, a second conveyor, and a lifting unit which raises and lowers at least one of the first and second conveyors, the first conveyor having a first conveying path located in a fixed planar region and conveying an article to be conveyed in a fixed direction, the second conveyor having a second conveying path arranged in the same planar region as the first conveying path and conveying the article to be conveyed in a direction crossing a conveying direction of the first conveying path, the lifting unit raising one of the conveying paths to above the other conveying path to convey the article to be conveyed in a predetermined direction, wherein the lifting unit has a lifting mechanism having a plurality of combined members, and a motor, the lifting mechanism converting a rotation force of the motor to movement in a lifting direction, transmitting the movement to at least one of the first and second conveyors, and lifting at least one of the first and second conveyors, wherein, in an advancing-side physical operation limit and a returning-side physical operation limit, the motor which has been started to be rotated forward and reversely is mechanically blocked to be unrotatable any more, wherein, at one of the physical operation limits, one of the conveying paths is raised to above the other conveying path, wherein the motor is rotated at a fixed initial speed when the lifting mechanism is made to reach from one of the physical operation limits to the other physical operation limit and then the motor is rotated at a speed lower than the initial speed, and an electric current flowing into the motor is monitored, and wherein current supply into the motor is stopped in a position where the electric current flowing into the motor changes abruptly or when the electric current flowing into the motor exceeds a fixed value.

12. The transfer apparatus according to claim 11, wherein when the motor is rotated at a speed lower than the initial speed, the motor to which inertia is added is rotated.

13. The transfer apparatus according to claim 11, wherein in the physical limit identification operation, the motor is rotated by inertia to generate electricity so that the electric current is substantially unsupplied from outside to the motor.

14. A positioning method of a device having a motor in which a driven body is brought into a predetermined position or posture in such a manner that a rotation force of the motor is transmitted to operate the driven body and the motor is stopped when the driven body reaches the predetermined position, the method comprising:

in a process of finally stopping the motor,
executing a physical limit identification operation in which the motor is rotated to operate the driven body to a physical operation limit whereupon rotation of the motor is stopped by being mechanically blocked and current supply into the motor is stopped, and
in a physical limit identification operation,
changing control of the motor so that the motor is rotated at low speed after started,
monitoring an electric current flowing into the motor, and
stopping the motor in a position where the electric current flowing into the motor changes abruptly or a position where the electric current flowing into the motor exceeds a fixed value.

15. The positioning method according to claim 14, wherein when control of the motor is changed so that the motor is rotated at low speed, the motor to which inertia is added is rotated.

16. The positioning method according to claim 14, wherein, in the physical limit identification operation, the motor is rotated by inertia to generate electricity so that the electric current is substantially unsupplied from outside to the motor.

17. The positioning method according to claim 14, wherein the physical operation limit includes an advancing-side physical operation limit and a returning-side physical operation limit, and wherein the number of rotations of the motor is monitored when the driven body is made to reach from one of the physical operation limits to the other physical operation limit, and the motor is rotated at low speed after the number of rotations of the motor exceeds a predetermined value.

18. The positioning method according to claim 14, wherein the physical operation limit includes an advancing-side physical operation limit and a returning-side physical operation limit, and wherein the motor is rotated at a fixed initial speed when the driven body is made to reach from one of the physical operation limits to the other physical operation limit, and then the motor is braked temporarily and is further rotated at a speed lower than the initial speed.

19. A positioning method of a device having a motor in which a driven body is brought into a predetermined position or posture in such a manner that a rotation force of the motor is transmitted to operate the driven body and the motor is stopped when the driven body reaches the predetermined position, wherein in an advancing-side physical operation limit and a returning-side physical operation limit, the motor which has been started to be rotated forward and reversely is mechanically blocked to be unrotatable any more, wherein the motor is rotated at a fixed initial speed when the driven body is made to reach from one of the physical operation limits to the other physical operation limit, then the motor is rotated at a speed lower than the initial speed, and an electric current flowing into the motor is monitored, and wherein current supply into the motor is stopped in a position where the electric current flowing into the motor changes abruptly or when the electric current flowing into the motor exceeds a fixed value.

20. The positioning method according to claim 19, wherein the motor is rotated at the fixed initial speed when the driven body is made to reach from one of the physical operation limits to the other physical operation limit, is then braked temporarily, and is further rotated at a speed lower than the initial speed.

* * * * *